United States Patent Office 3,849,424
Patented Nov. 19, 1974

3,849,424
PROCESS FOR PREPARING DIHYDROPYRIDO-
BENZOXA (OR THIA)ZEPINES, INTERMEDI-
ATES AND DERIVATIVES
Harry Louis Yale, New Brunswick, N.J., assignor to E. R.
Squibb & Sons, Inc., New York, N.Y.
No Drawing. Original application Apr. 6, 1970, Ser. No.
26,147, now abandoned. Divided and this application
Mar. 6, 1972, Ser. No. 232,283
Int. Cl. C07d 31/50
U.S. Cl. 260—294.8 F     8 Claims

ABSTRACT OF THE DISCLOSURE

A process is provided for preparing amino-halobenzyl-oxy (or thio) pyridines empolying as a starting material an aminopyridinol, an aminopyridinethiol or a derivative thereof. The amino-halobenzyloxy (or thio) pyridine compound can be converted to the corresponding dihydropyridobenzoxa (or thia) zepine derivatives which are useful as antibacterial agents as well as ataractic agents and antihistamines.

This is a division of application Ser. No. 26,147, filed Apr. 6, 1970, now abandoned.

U.S. Pat. No. 3,069,432 to Yale et al., dated Dec. 18, 1962, discloses dihydrodibenzoxazepines of the structure:

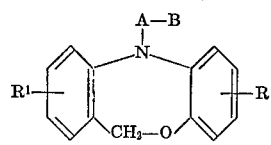

where A is lower alkylene and B is a basic saturated nitrogen containing radical. This patent describes as starting materials for the preparation of the above compound an o-halobenzyl halide and an o-nitrophenol, which are reacted to form an o-halobenzyl o-nitrophenyl ether in accordance with the following reaction (wherein X' is chloro or bromo).

(Step 1)

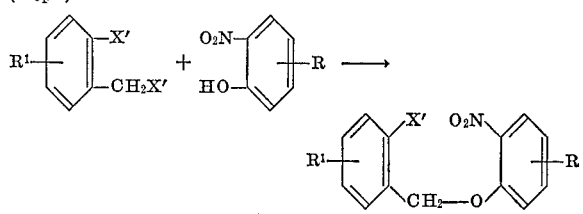

In Step (2) the nitro group is reduced to an amide by treatment with a reducing agent thereby forming the corresponding 2-(o-halobenzyloxy)aniline derivative.

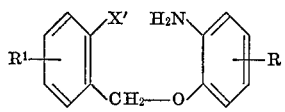

The aniline derivative is then treated with formic acid wherein the corresponding 2-(o-halobenzyloxy)formanilide derivative is produced. The formanilide can then be cyclized and the dihydrodibenzoxazepine compounds formed.

It has been suggested that in order to reduce the number of chemical reactions required in preparing the dihydrodibenzoxazepines, the o-nitrophenol starting material be replaced by an o-aminophenol so that the 2-(o-halobenzyloxy)aniline derivatives could be prepared directly in the initial step. Unfortunately, reaction of an o-aminophenol and an o-halobenzyl halide does not produce the desired 2-(o-halobenzyloxy)aniline derivative, but instead gives o-[N,N-di(o-halobenzyl)amino]phenol and polymeric products.

It has now surprisingly been found that where the o-aminophenol will not react with an o-halobenzyl halide to directly form the desired 2-(o-halobenzyloxy)aniline derivative, an aminopyridinol or pyridinethiol or derivative thereof will react with an o-halobenzyl halide to form the desired amino-[(o-halobenzyl)oxy (or thio)] pyridine.

In accordance with the present invention, a process is provided for preparing amino[(o-halobenzyl)oxy (or thio)]pyridines of the structure:

I 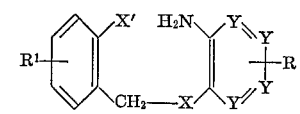

wherein one Y is nitrogen and the remaining are carbon, X is oxygen or sulfur, X' is halogen, and R and $R^1$ are the same or different and can be hydrogen, halogen, lower alkyl, trifluoromethyl, or N,N-dimethylaminosulfonyl. The process comprises employing as a starting material an aminopyridine compound selected from the group consisting of (1) an aminopyridinol or aminopyridinethiol:

II 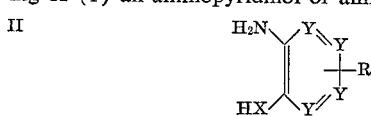

or (2) an acylated aminopyridinol or acylated aminopyridinethiol.

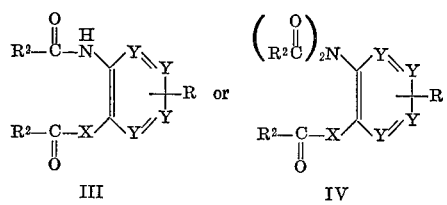

III     IV wherein $R^2$ is alkyl containing from one to about three carbon atoms or (3) an alkali metal salt of a pyridine amide, namely V 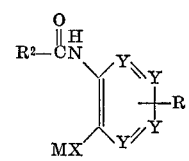

wherein M is an alkali metal such as sodium, potassium or lithium, and reacting the aminopyridine compound with an o-halobenzyl halide VI 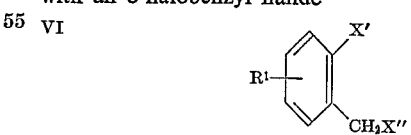

and, if necessary, saponifying any acyl groups that may be attached to the N atom attached to the pyridine nucleus of the resulting o-halobenzyloxy (or thio) pyridine compound, to form the amino-[(o-halobenzyl) oxy (or thio)]pyridine of Formula I.

The lower alkyl groups which can be included as R or $R^1$ substituents in any of the above reactants or products include straight and branched chain saturated aliphatic groups containing up to eight carbon atoms, such as methyl, ethyl, propyl, isopropyl, butyl, sec-butyl, tert-butyl, isobutyl, amyl, isoamyl, hexyl, heptyl, octyl, iso-octyl, and the like. Methyl and ethyl are preferred.

Each of the four halogens is contemplated as R, R¹, or X″ substituents in the above compounds. X′ can be bromine or iodine.

Among the suitable o-halobenzyl halides utilizable as initial reagents in these reactions may be mentioned: o-halobenzyl halides, such as o-bromobenzyl bromide, o-chlorobenzyl chloride and o-bromobenzyl chloride; halo-o-halobenzyl halides, such as 2,5-dibromobenzyl bromide, 2,4-dibromobenzyl bromide, 2-bromo-5-fluorobenzyl chloride, 2-bromo-5-chlorobenzyl chloride, and 2-bromo-4-fluorobenzyl chloride; (lower alkyl)-o-halobenzyl halides, such as 5-(lower alkyl)-2-halobenzyl halides (e.g., 5-methyl-2-bromobenzyl chloride, 5-ethyl-2-bromobenzyl bromide, 5-n-propyl-2-bromobenzyl bromide and 5-n-hexyl-2-chlorobenzyl chloride) and 4-(lower alkyl)-2-halobenzyl halides; (lower alkoxy)-o-halobenzyl halides, such as 5-(lower alkoxy)-2-halobenzyl halides (e.g., 5-methoxy-2-bromobenzyl bromide, 5-ethoxy-2-bromobenzyl chloride, 5-n-propoxy-2-bromobenzyl chloride and 5-n-hexyloxy-2-chlorobenzyl chloride); (trifluoromethyl)-o-halobenzyl halides, such as 5-(trifluoromethyl)-2-bromobenzyl chloride and 4-(trifluoromethyl)-2-bromobenzyl bromide; (trifluoromethylmercapto)-o-halobenzyl halides, such as 5-(trifluoromethylmercapto)-2-bromobenzyl chloride and 4-(trifluoromethylmercapto)-2-bromobenzyl bromide; (trifluoromethoxy)-o-halobenzyl halides, such as 5-(trifluoromethoxy)-2-bromobenzyl chloride and 4-(trifluoromethoxy)-2-bromobenzyl bromide; and (N,N-dimethylaminosulfonyl)-o-halobenzyl halides, such as 5 - (N,N - dimethylaminosulfonyl) - 2 - bromobenzyl chloride and 4 - (N,N - dimethylaminosulfonyl)-2-bromobenzyl bromide.

Among the suitable aminopyridinethiols and aminopyridinols utilizable as initial reagents in these reactions may be mentioned: 2-amino-3-pyridinol; 2-amino-3-pyridinethiol; 3-amino-2-pyridinol; 3-amino-2-pyridinethiol; 3-amino-4-pyridinol; 3-amino-4-pyridinethiol; 4-amino-3-pyridinol; 4-amino-3-pyridinethiol; halo substituted derivatives of each of these, such as 5-chloro-2-amino-3-pyridinol, 5-chloro - 3 - amino - 2 - pyridinol, 5-chloro-2-amino-3-pyridinethiol, 5-chloro-3-amino-2-pyridinethiol, 4-chloro-2-amino-3-pyridinol, 5-fluoro-2-amino-3-pyridinethiol, 5-bromo-2-amino-3-pyridinol and 5-3-bromo-2-amino-3-pyridinethiol; (lower alkyl) substituted derivatives of each of these, such as 5-methyl-2-amino-3-pyridinol, 5-methyl-3-amino-2-pyridinol, 5-methyl-2-amino-3-pyridinethiol, 5-methyl-3-amino-2-pyridinethiol, 4-ethoxy-2-amino-3-pyridinol, 5-propoxy-2-amino-3-pyridinethiol, 5-ethyl-2-amino-3-pyridinol and 5-n-hexyl-2-amino-3-pyridinethiol; (lower alkoxy) substituted derivatives of each of these, such as 5-methoxy-2-amino-3-pyridinol, 5-methoxy-3-amino-2-pyridinol, 5-methoxy-2-amino-3-pyridinethiol, 5-methoxy-3-amino-2-pyridinethiol, 4-ethoxy-2-amino3-pyridinol, 5-propoxy-2-amino-3-pyridinethiol, 5-ethoxy-2-amino-3-pyridinol and 5-n-hexyloxy-2 - amino - 3 - pyridinethiol; trifluoromethyl substituted derivatives of each of these, such as 5-trifluoromethyl-2-amino-3-pyridinol, 5-trifluoromethyl-3-amino-2-pyridinol, 5-trifluoromethyl-2 - amino - 3 - pyridinethiol, 5-trifluoromethyl-3-amino-2-pyridinethiol and 4-trifluoromethyl-2-amino - 3 - pyridinol and N,N - dimethylaminosulfonyl derivatives of each of these.

The above aminopyridinols and aminopyridinethiols can be prepared from the corresponding nitropyridinols or nitropyridinethiols by reduction using procedures well known in the art.

The reaction of the aminopyridinol or the aminopyridinethiol with the o-halobenzyl halide is normally carried out at reflux temperature, although temperatures of within the range of from about 20 to about 100° C. can be employed. A molar ratio of aminopyridine:o-halobenzyl halide of within the range from about 0.8:1 to about 1.3:1 and preferably from about 1.0:1 to about 1.1:1 is satisfactory.

The reaction with the o-halobenzyl halide is preferably conducted in the presence of an organic solvent such as an alcohol or a ketone boiling below about 100° C. Suitable alcohols include monohydric alcohols containing from about one to about four carbon atoms, such as methyl alcohol, ethyl alcohol, propyl alcohol and isopropyl alcohol. Suitable ketones include acetone and ethyl methyl ketone. The reaction is also carried out in the presence of a base such as an alkali metal or alkaline earth metal hydroxide or alkoxide containing up to about four carbon atoms. Examples of such bases include sodium hydroxide, potassium hydroxide, calcium hydroxide, magnesium hydroxide, barium hydroxide, sodium methoxide, sodium ethoxide, potassium methoxide, sodium n-propoxide, sodium butoxide, potassium ethoxide, calcium dimethoxide, barium di-n-propoxide and magnesium diethoxide.

Examples of suitable acylated aminopyridine compounds (Formulae III and IV) useful as starting materials correspond to those set out hereinbefore with respect to the aminopyridinols and aminopyridinethiols, wherein the hydrogen attached to X is replaced by

and one or both of the hydrogens attached to N is replaced by one or two

groups. The acylated compounds of Formulae III and IV can be prepared by reacting an aminopyridine or aminopyridinethiol with an acidic reactant such as ketone, or an aliphatic acid anhydride containing from about four to about eight carbon atoms, such as acetic anhydride, propionic anhydride or butyric anhydride, or an alkanoyl halide containing from two to about four carbon atoms, such as acetyl chloride, acetyl bromide, acetyl iodide, propionyl chloride, or butanoyl bromide.

Where the monoacylated pyridine compounds (that is those of Formula III) are desired, the reaction is carried out normally at room temperature, although temperatures within the range of from about 10° to about 40° C. can be employed, employing a molar ratio of aminopyridine reactant to the acid reactant of within the range of from about 1:2 to about 1:10 and preferably from about 1:2 to about 1:4.

Where the diacylated pyridine compounds (that is those of Formula IV) are desired, the reaction is normally carried out at reflux temperature, although temperatures of within the range of from about 80 to about 200° C. can be employed, in the prescence of p-toluenesulfonic acid. The reactants are employed in a molar ratio to each other (aminopyridine compound:acid compound) of within the range of from about 1:3 to about 1:10 and preferably from about 1:3 to about 1:6.

The acylated aminopyridine compounds (III or IV) are reacted with the o-halobenzyl halide in a molar ratio of pyridine:halide of within the range of from about 0.8:1 to about 1.3:1 and preferably from about 1.0:1 to about 1.1:1. The reaction is carried out in the presence of an alkali metal or alkaline earth metal base and an organic solvent boiling below about 100° C. as described hereinbefore in conjunction with the use of the aminopyridinol or aminopyridinethiol starting materials.

Reaction of the acylated aminopyridine compounds with the o-halobenzyl halide gives an N-[o-halobenzyl]oxy (or thio)-pyridyl]alkanoylamide of the structure:

VII

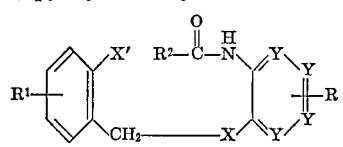

which is treated with a monohydric alcohol containing up to three carbon atoms, such as methyl alcohol, ethyl alcohol, propyl alcohol or iso-propyl alcohol, and a base such as any of the alkali metal or alkaline earth metal bases mentioned hereinbefore to form the amino-[(o-halobenzyl)oxy (or thio)]pyridines of Formula I.

The alkali metal salt starting material (Formula V) is prepared by reacting an aminopyridinol or aminopyridinethiol of the Formula II with an alkali metal hydroxide or alkoxide containing up to about four carbon atoms, such as sodium hydroxide, potassium hydroxide, lithium hydroxide, sodium methoxide, potassium methoxide, sodium ethoxide, potassium ethoxide, sodium propoxide and the like, in a molar ratio of pyridine compound to alkali metal compound of within the range of from about 0.8:1 to about 1.5:1, in an alcohol solvent, such as a monohydric alcohol boiling below 100° C. as mentioned hereinbefore, at a temperature within the range of from about 20 to about 90° C. to form an alkali metal salt of the structure:

VIII

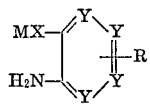

which is reacted with acidic compound, such as an aliphatic acid anhydride, alkanoyl halide or ketene as mentioned in the preparation of the acylated pyridines, in a molar ratio of the alkali metal salt:acidic compound of within the range of from about 1:1 to about 1:1.5 at a temperature within the range of from about 10 to about 50° C. to form the acylated derivative of Formula V:

V

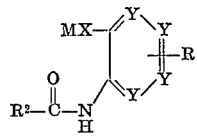

The acylated alkali metal salt is reacted with the o-halobenzyl halide in a molar ratio of alkali salt:halide within the range of from about 0.8:1 to about 1.5:1 at a temperature within the range of from about 20 to about 100° C. to form the amino-[(o-halobenzyl)oxy (or thio)]pyridines of Formula I.

In accordance with another embodiment of the invention dihydropyridobenzoxa (or thia)zepine derivatives of the structure:

IX

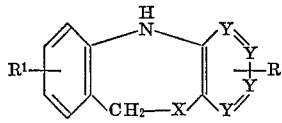

can be prepared from the amino-[(o-halobenzyl)oxy (or thio)]pyridine compound of Formula I as follows.

The amino-[(o-halobenzyl)oxy (or thio)] pyridine is treated with formic acid or a combination of formic acid and dicyclohexylcarbodiimide employing an aprotic solvent, such as ethyl acetate, tetrahydrofuran or N,N-dimethylformamide. The formylation reaction is carried out at a temperature within the range of from about 0 to about 40° C. and preferably from about 10 to about 20° C., whereby the corresponding formanilide derivative is formed having the following structure:

X

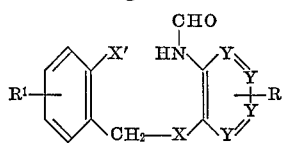

The formanilide is then cyclized by treatment with a basic reagent (e.g., potassium carbonate and sodium carbonate) in a solvent (e.g., N,N-dimethylformamide, N,N-dimethylacetamide or nitrobenzene) at an elevated temperature, for example, within the range of from about 150 to about 170° C., to form the corresponding dehydropyridobenzoxa (or thia)zepine.

The formanilide of Formula X can also be cyclized as follows. The formanilide of Formula X is dissolved in a solvent, such as anhydrous diethylbenzene, diphenyl ether, or a mixture of diphenyl ether with biphenyl, preferably a solution of approximately 1% to 10% (w./v.) concentration, and most preferably 3 to 7%. Preferably then about 4.8 to 20.0 parts by weight of potassium carbonate and about 0.1 to 1.0 part by weight of copper are added. The mixture may then be heated for about 1 to 5 hours at an internal temperature in the range of about 150 to about 170° C. At the completion of the reaction the mixture is filtered and the filtrate is concentrated, e.g., by distillation or on a rotary evaporator under vacuum, to obtain the product. Technical grade or better of these solvent materials is preferred. A mixture of diphenyl ether with biphenyl is used which contains a major proportion of diphenyl ether, i.e., in excess of 50% diphenyl ether. Preferred is a eutectic mixture containing approximately 73% diphenyl ether and 27% of biphenyl which is available commercially under the trademark Dowtherm A.

The resulting cyclized formanilide can then be hydrolyzed, as by treatment with a base, for example, any of the alkali metal or alkaline earth metal bases mentioned hereinbefore, at an elevated temperature to yield the dihydropyridobenzoxa (or thia)zepine derivatives. These compounds are intermediates for the synthesis of products shown in U.S. Pat. No. 3,123,614, dated Mar. 3, 1964.

The following examples in the opinion of the inventor represent preferred embodiments of his invention:

EXAMPLE 1

2-amino-3-[(o-bromobenzyl)oxy]pyridine

To a suspension of 24.0 g. (0.22 mole) of 2-amino-3-pyridinol in 100 ml. of absolute ethanol is added in 20 min., a solution of 12.0 g. (0.22 mole) of sodium methoxide in 200 ml. of absolute ethanol and in another 20 min., 54.2 g. (0.22 mole) of o-bromobenzyl bromide. The mixture is heated under reflux for 2.5 hr. and then concentrated to dryness in vacuo. The residue is suspended in 150 ml. of water and extracted with 2 150-ml. portions of ethyl ether. The ethyl ether extracts are agitated for one hour with 50 ml. of 20% aqueous NaOH, the ethyl ether solution is separated, washed with 20 ml. of saturated aqueous NaCl, dried, and concentrated to give 22.3 g. (36% yield) of 2-amino - 3 - [(o-bromobenzyl)oxyl]-pyridine, m.p. about 105–107° C.

EXAMPLE 2

N-[3-[(o-bromobenzyl)oxy]-2-pyridyl]formamide

To 67.0 g. (0.24 mole) of 2-amino - 3 - [(o-boromobenzyl)oxy]pyridine in 1800 ml. of ethyl acetate is added 100.0 g. (0.48 mole) of N,N'-dicyclohexylcarbodiimide in 100 ml. of ethyl acetate, the mixture cooled to 5°, and 22.5 g. (0.48 mole) of 98–100% HCO₂H in 100 ml. ethyl acetate added in 20 min. The mixture is stirred and allowed to come to room temperature, filtered to remove 1,3-dicyclohexylurea, and the filtrate concentrated in vacuo to ca 80 ml., cooled, and the solid filtered to give 42.0 g. (67% yield) of N - [3-[(o-bromobenzyl)oxy] - 2-pyridyl] formamide, m.p. about 128–130°.

EXAMPLE 3

6,11-dihydropyrido[3,2-b][4,1]benzoxazepine-11-carboxaldehyde

A mixture of 68.6 g. (0.22 mole) of N-[3-[(o-bromobenzyl)oxy] - 2 - pyridyl]formamide (m.p. 125–131°), 138.0 g. (1.0 mole) of potassium carbonate, 6.0 g. of copper bronze, and 1600 ml. of diethylbenzene is stirred and heated at an internal temperature of 155–160° for 2 hr., cooled to 60°, and filtered. The filtrate is concentrated in vacuo to give 40.1 g. (80% yield) of 6,11-dihydropyrido[3,2-b][4,1]benzoxazepine - 11 - carboxaldehyde, m.p. about 143–145°.

EXAMPLE 4

When an equal volume of Dowtherm A (a eutectic mixture of 73% diphenyl ether and 27% of biphenyl) replaces the diethylbenzene, with all other conditions remaining unchanged, the yield of 6,11 - dihydropyrido[3,2-b][4,1] benzoxazepine-11-carboxaldehyde is 70%.

EXAMPLE 5

6,11-dihydropyrido[3,2-b][4,1]benzoxazepine 37.5 g. (0.16 mole) 6,11 - dihydropyrido[3,2-b][4,1] benzoxazepine - 11 - carboxaldehyde (m.p. 141–145°), 700 ml. of ethyl alcohol, and 70 ml. of 50% aqueous NaOH are refluxed for one hour and concentrated in vacuo. The residue is stirred with 100 ml. of water, filtered, and dried to give 29.5 g. (89% yield) of 6,11-dihydropyrido[3,2-b][4,1]benzoxazepine, m.p. about 111–113°.

EXAMPLE 6

(a) N-(hydroxy-2-pyridyl) acetamide acetate 5.1 g. (0.046 mole) of 2-amino-3-pyridinol is added to 25.0 ml. of acetic anhydride; the resulting reaction is silghtly exothermic but is allowed to proceed without cooling. The mixture, after 18 hr. at room temperature, is concentrated to dryness in vacuo to give N-(3-hydroxy-2-pyridyl)acetamide acetate, m.p. about 125–127°.

(b) N-[3-[(o-bromobenzyl)oxy]-2-pyridyl]-acetamide

To 8.8 g. (0.045 mole) of N-(3-hydroxy-2-pyridyl)-acetamide acetate in 125 ml. of 95% ethanol is added, in 22 min., 4.9 g. (0.09 mole) of sodium methoxide in 50 ml. of absolute ethanol, The mixture is stirred for one hour at room temperature (pH 8.3) and then 11.6 g. (0.045 mole) of o-bromobenzyl bromide is added in 11 min.; the pH is then 8.1. Heating under reflux for 16 min. changes the pH to 5.3; the mixture is promptly poured into 500 ml. of ice-H₂O, the solid filtered, and air-dried to give 12.0 g. (82% yield) of N-[3[(o-bromobenzyl) oxy]-2-pyridyl]acetamide, m.p. about 140–142°.

(c) Saponification to 2-amino-3-[(o-bromobenzyl) oxy]pyridine

A two-phase system is formed from 5.1 g. (0.016 mole) of N - [3-[(o - bromobenzyl)oxy]-2-pyridyl]acetamide, 75. ml. of 2-propanol and 20 ml. of 50% aqueous NaOH. The mixture is stirred and heated under reflux for one hour, cooled, the lower aqueous solution separated, the 2-propanol solution washed with 10 ml. of saturated aqueous NaCl, filtered, and the filtrate concentrated to dryness in vacuo to give 3.2 g. (91% yield) of 2-amino-3-[(o-bromobenzyl)-oxy]pyridine, m.p. about 105–107°.

EXAMPLE 7

2-(diacetylamino)-3-pyridinol acetate (a) A solution of 25.0 g. (0.23 mole) of 2-amino-3-pyridinol, 100 ml. of acetic anhydride and 0.5 g. of p-toluenesulfonic acid is heated under reflux for 2 hrs. and then concentrated to dryness in vacuo. The residual oil crystallizes when triturated with 100 ml. of cyclohexane. This solid, 46.1 g., m.p. 75–109° is heated under reflux with 5 liters of cyclohexane and filtered hot. The insoluble material weighs 8.4 g. and is found to be N-(3-hydroxy-2-pyridyl)acetamide acetate. From the cyclohexane filtrates are recovered on cooling, 35.5 g. (66% yield) of 2-(diacetylamino)-3-pyridinol acetate, m.p. about 81–83°.

(b) 2-(diacethylamino)-3-pyridinol acetate 8.4 g. N-(3-hydroxy-2-pyridyl)acetamide acetate from (a), 35 ml. of acetic anhydride and 0.7 g. of p-toluenesulfonic acid are reacted as above. The residue from the concentration crystallizes when triturated with ligroin, m.p. 75–77°. Recrystallization from 700 ml. of cyclohexane gives 7.7 g. (75% yield) of 2-(diacetylamino)-3-pyridinol acetate, m.p. about 81–83° and identical with the product obtained above (a) by mixture m.p. and comparison of their IR spectra.

(c) N-[3-[(o-bromobenzyl)oxy]-2-pyridyl]acetamide

To a solution of 35.5 g. (0.15 mole) of 2-(diacetylamino)-3-pyridinol acetate in 600 ml. of 95% ethanol is added in 25 min. a solution of 9.6 g. (0.18 mole) of sodium methoxide in 200 ml. of absolute ethanol; the pH is 9.2.

To this solution is added 37.8 g. (0.15 mole) of o-bromobenzyl bromide in 0.5 hr.; the pH remains unchanged. At the b.p., the mixture has a pH of 7.8 and after 10 min. under reflux, the pH is 7.4. The mixture is heated an additional 5 min., and poured into 2500 ml. of ice-H₂O. The solid is filtered, air-dried, and triturated with 150 ml. of ligroin to give 49.3 g. (quantitative yield) of N - [3-[(o - bromobenzyl)oxy]-2-pyridyl]acetamide, m.p. about 157–159°.

(d) In a manner similar to that described in Example 6, the N - [3[(o-bromobenzyl)oxy]-2-pyridyl]acetamide is saponified to 2-amino-3-[(o-bromobenzyl)oxy]pyridine.

EXAMPLE 8

2-amino-3-[(o-bromobenzyl)oxy]pyridine via N-(3-hydroxy-2-pyridyl)acetamide, sodium salt To 5.5 g. (0.05 mole) of 2-amino-3-pyridinol in 80 ml. of absolute methanol is added in 10 min. at room temperature, a solution of 2.7 g. (0.05 mole) of sodium methoxide in 20 ml. of absolute methanol, the solution heated under reflux for one hour, and concentrated in vacuo. The residual semisolid is very hydroscopic. It is shaken at room temperature with 5 ml. of acetic anhydride for five hours when there gradually forms a granular mass. This is filtered and weighs 4.3 g. Recrystallization from 180 ml. of absolute ethanol gives 2.5 g. of crude sodium salt of 3-hydroxy-2-pyridylacetamide, m.p. about 275–278°.

To a solution of 4.2 g. (0.024 mole) of the sodium salt in 50 ml. of absolute methanol is added 6.0 g. (0.024 mole) of o-bromobenzyl bromide in 5 ml. of absolute methanol, the mixture stirred and heated under reflux for 2.5 hr., poured into 200 ml. of ice-H₂O, the solid filtered, and dried to give 5.3 g. of material, m.p. 115–120°. Recrystallization from cyclohexane gives 1.6 g. of N-[3-[(o-bromobenzyl)oxy]-2-pyridyl]acetamide, m.p. about 157–159°.

In a manner similar to that described in Example 6, the N - [3-[(o - bromobenzyl)oxy]-2-pyridyl]acetamide is saponified to 2-amino-3-[(o-bromobenzyl)oxy]pyridine.

EXAMPLE 9

2-amino-3-[(o-bromobenzyl)thio]pyridine

By substituting 27.7 g. (0.22 mole) of 2-amino-3-pyridinethiol for the 2-amino-3-pyridinol in Example 1, there is obtained 2 - amino-3-[(o-bromobenzyl)thio]pyridine.

EXAMPLE 10

N-[3-[(o-bromobenzyl)thio]-2-pyridyl]formamide

Proceeding as in Example 2 but substituting 74.5 g. (0.24 mole) of 2-amino-3-[(o-bromobenzyl)thio]pyridine prepared as in Example 2 for the 2-amino-3-[(o-bromobenzyl)oxy]pyridine, there is obtained N-3-[(o-bromobenzyl)thio]-2-pridyl]formamide.

EXAMPLE 11

6,11-dihydropyrido[3,2-b][4,1]benzothiazepine-11-carboxaldehyde

Proceeding as in Example 3, but substituting 3.5 g. (0.24 mole) N - [3-[(o-bromobenzyl)thio]-2-pyridyl]-formamide for the N-[3-[(o-bromobenzyl)oxy]-2-pyridyl]formamide, there is obtained the above - titled compound.

EXAMPLE 12

6,11-dihydropyrido[3,2-b][4,1]benzothiazepine

Proceeding as in Example 5 but substituting 40.6 g. (0.16 mole) 6,11-dihydropyrido[3,2-b][4,1]benzothiazepine - 11 - carboxaldehyde for 6,11-dihydropyrido[3,2-b]-[4,1]benzoxazepine-11-carboxaldehyde, there is obtained the above-titled compound.

EXAMPLE 13

(a) N-(mercapto-2-pyridyl)acetamide acetate

Proceeding as in Example 6(a), but substituting 5.8 g. (0.046 mole) 2 - amino-3-pyridinethiol in place of 2-amino-3-pyridinol, there is obtained the above - titled compound.

(b) N - [3-[(o-bromobenzyl)thio]-2-pyridyl]-acetamide

Proceeding as in Exampl 6(b) but substituting 11.6 g. (0.046 mole) of N-(3-mercapto-2-pyridyl) acetamide acetate for the N-(3-hydroxy-2-pyridyl)acetamide acetate, there is obtained the above-titled compound.

(c) Saponification to 2-amino-3-[(o-bromobenzyl)thio]-pyridine

Proceeding as in Example 6(c) but substituting 9.45 g. (0.046 mole) N - [3 - [(o-bromobenzyl)thio]-2-pyridyl]-acetamide for the N-[3-[(o-bromobenzyl)oxy] - 2 - pyridyl]-acetamide, there is obtained the above-titled compound.

EXAMPLE 14

2-(diacetylamino)-3-pyridinethiol acetate (a) Proceeding as in Example 7(a) but substituting 29.0 g. (0.23 mole) of 2-amino-3-pyridinethiol for 2-amino-3-pyridinol, there is obtained the above-titled compound.

(b) N-[3-[(o-bromobenzyl)thio]-2-pyridyl]acetamide

Proceedings in a manner similar to the procedure of Example 7(b) but substituting 2-(diacetylamino)-3-pyridinethiol acetate for 2-(diacetylamino)-3-pyridinol acetate, there is obtained the above-titled compound.

EXAMPLE 15

2-Amino-3-[(o-bromobenzyl)thio]pyridine via N-(3-mercapto-2-pyridyl)acetamide, sodium salt Proceedings as in Example 8 but substituting 2-amino-3-pyridinethiol (6.3 g., 0.05 mole) for 2-amino-3-pyridinol, there is obtained the sodium salt of 3-mercapto-2-pyridyl acetamide (9.2 g.) which is reacted with o-bromobenzyl bromide in accordance with Example 8 to yield N - [3-[(o-bromobenzyl)thio]-2-pyridyl]acetamide which is saponified to 2 - amino - 3 - [(o - bromobenzyl)thio]-pyridine.

EXAMPLE 16 o-Bromobenzyl-5-chloro-3-amino-2-pyridyl sulfide

Proceeding as in Example 1 but substituting 53.8 g. (0.22 mole) of 5-chloro-3-amino-2-pyridinethiol (prepared from 5-chloro-2-pyridine via nitration and subsequent reduction, followed by chlorination and replacement of the 2-chloro atom by SH) for the 2-amino-3-pyridinol, there is obtained the above-titled compound.

EXAMPLE 17

Following the procedures of Examples 2, 3 and 5, but substituting 83.0 g. of o-bromobenzyl-5-chloro-3-amino-2-pyridyl sulfide for the 2-amino-3-[(o-bromobenzyl)-oxy]pyridine in Example 2, there is obtained 3-chloro-5,10-dihydropyrido[3,2-b][4,1]benzothiazepine.

EXAMPLE 18

3,8-dichloro-6,11-dihydropyrido[3,2-b][4,1]benzoxazepine

By substituting 65.5 g. (0.22 mole) of p-chloro-o-bromobenzyl chloride for the o-bromobenzyl bromide and 31.8 g. (0.22 mole) of 5-chloro-2-amino-3-pyridinol for the 2-amino-3-pyridinol in Example 1 following the procedures of that example, as well as the procedures in Examples 2, 4 and 5, there is obtained the above-titled compound.

EXAMPLE 19

8-chloro-6,11-dihydropyrido[3,2-b][4,1]benzoxazepine

By substituting 65.5 g. (0.22 mole) of o-bromo-p-chlorobenzyl bromide (prepared by bromination of p-chlorotoluene to give first o-bromo-p-chlorotoluene followed by allylic bromination) in Example 1, there is obtained the above-titled compound.

EXAMPLES 20 TO 25

By reacting the acylated aminopyridinol or aminopyridinethiol shown in column 2 of Table I with an o-halobenzyl halide shown in column 1 in accordance with the procedure of Example 6, there is obtained the product shown in the right-hand part of Table I.

TABLE I

| | Starting materials | | | | | | | | | Product | | | | | | | |
|---|---|---|---|---|---|---|---|---|---|---|---|---|---|---|---|---|---|
| | O-Halobenzyl halide | | Acylated aminopyridinol or pyridinethiol | | | | | | | | | | | | | | |
| Ex. No. | R' | X' | X'' | $Y^I$ | $Y^{II}$ | $Y^{III}$ | $Y^{IV}$ | X | R | $R^2$ | R' | X' | $Y^I$ | $Y^{II}$ | $Y^{III}$ | $Y^{IV}$ | X | R |
| 20 | 6-Br | Br | Br | N | C | C | C | O | 5-Br | $C_2H_5$ | 6-Br | Br | N | C | C | C | O | 5-Br |
| 21 | 3-$CH_3$ | I | Cl | C | N | C | C | O | H | $CH_3$ | 3-$CH_3$ | I | C | N | C | C | O | H |
| 22 | 5-Cl | Br | I | N | C | C | C | S | 6-$CH_3O$ | $CH_3$ | 5-Cl | Br | N | C | C | C | S | 6-$CH_3O$ |
| 23 | 4-$CF_3$ | Br | F | C | C | N | C | S | 2-$CF_3$ | $CH_3$ | 4-$CF_3$ | Br | C | C | N | C | S | 2-$CF_3$ |
| 24 | 4-$(CH_3)_2NSO_2$ | Br | Br | N | C | C | C | O | H | $CH_3$ | 4-$(CH_3)_2NSO_2$ | Br | N | C | C | C | O | H |
| 25 | H | Br | Br | C | C | C | N | O | H | $CH_3$ | H | Br | C | C | C | N | O | H |

EXAMPLES 26 TO 30

By reacting the acylated aminopyridinol or aminopyridinethiol shown in column 2 of Table II with an o-halobenzyl halide shown in column 1 in accordance with the procedure outlined in Example 7, the product shown in the right-hand part of Table II is obtained.

TABLE II

| | Starting materials | | | | | | | | | Product | | | | | | | |
|---|---|---|---|---|---|---|---|---|---|---|---|---|---|---|---|---|---|
| | O-Halobenzyl halide | | Acylated aminopyridinol or pyridinethiol | | | | | | | | | | | | | | |
| Ex. No. | R' | X' | X'' | Y^I | Y^II | Y^III | Y^IV | X | R | R^2 | R' | X' | Y^I | Y^II | Y^III | Y^IV | X | R |
| 26 | 4-C₂H₅ | Br | Br | N | C | C | C | S | 4-CH₃ | CH₃ | 4-C₂H₅ | Br | N | C | C | C | S | 4-CH₃ |
| 27 | 3-Cl | Br | Cl | C | N | C | C | O | H | C₂H₅ | 3-Cl | Br | C | N | C | C | O | H |
| 28 | 4-CF₃ | I | Cl | C | C | N | C | O | 6-CF₃ | CH₃ | 4-CF₃ | I | C | C | N | C | O | 6-CF₃ |
| 29 | 5-(CH₃)₃C | Br | Br | C | C | C | N | S | 4-C₂H₅ | C₂H₅ | 5-(CH₃)₃C | Br | C | C | C | N | S | 4-C₂H₅ |
| 30 | 4-(CH₃)₂NSO₂ | I | I | N | C | C | C | O | H | CH₃ | 4-(CH₃)₂NSO₂ | I | N | C | C | C | O | H |

EXAMPLES 31 TO 35

By reacting the alkali metal salt of the pyridineamide shown in column 2 of Table III with an o-halobenzyl-halide as shown in column 1, in accordance with the procedure outlined in Example 8, the product shown in the right-hand part of Table III is obtained.

TABLE III

| | Starting materials | | | | | | | | | | | Product | | | | | | | |
|---|---|---|---|---|---|---|---|---|---|---|---|---|---|---|---|---|---|---|---|
| | O-Halobenzyl halide | | Alkali metal salt | | | | | | | | | | | | | | | | |
| Example number | R' | X' | X'' | Y^I | Y^II | Y^III | Y^IV | M | X | R | R^2 | R' | X' | Y^I | Y^II | Y^III | Y^IV | X | R |
| 31 | 4-C₂H₅ | Br | Br | N | C | C | C | Na | O | 4-CH₃ | CH₃ | 4-C₂H₅ | Br | N | C | C | C | O | 4-CH₃ |
| 32 | 6-C₂H₅ | Br | I | C | N | C | C | K | S | 6-CF₃ | C₂H₅ | 6-C₂H₅ | Br | C | N | C | C | S | 6-CF₃ |
| 33 | 4-CF₃ | I | I | C | C | N | C | Li | O | 6-Br | i-C₃H₇ | 4-CF₃ | I | C | C | N | C | O | 6-Br |
| 34 | 4-Br | Br | Cl | C | C | C | N | Na | S | H | C₄H₉ | 4-Br | Br | C | C | C | N | S | H |
| 35 | 3-Cl | Br | Br | N | C | C | C | K | O | 6-F | CH₃ | 3-Cl | Br | N | C | C | C | O | 6-F |

What is claimed is:

1. A process for preparing compounds of the structure

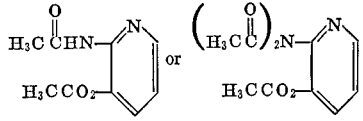

wherein X is oxygen or sulfur, R and R' are the same or different and are selected from the group consisting of hydrogen, halogen, lower alkyl, trifluoromethyl or N,N-dimethylaminosulfonyl; X' is bromine or iodine and one Y is aza and the remainder carbon, which comprises reacting at a temperature of from about 20° C. to about 100° C., in an organic solvent boiling below about 100° C., an aminopyridine compound selected from the group consisting of an aminopyridinol, aminopyridinethiol or an acylated derivative thereof or a sodium derivative thereof, with an o-halobenzyl halide, and, if necessary, saponifying any acyl groups attached to the N atom attached to the pyridine nucleus of the resulting halobenzyloxy (or thio) pyridine, to form an amino-halobenzyloxy (or thio) pyridine of the above structure.

2. A process in accordance with Claim 1 wherein the o-halobenzyl halide is o-bromobenzyl halide.

3. A process in accordance with Claim 1 wherein the aminopyridinol is 2-amino-3-pyridinol.

4. A process in accordance with Claim 1 wherein the acylated derivative of the aminopyridinol has the structrure:

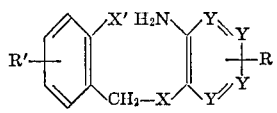

5. A process in accordance with Claim 4 wherein the acylated derivative is prepared by reacting 2-amino-3-pyridinol with acetic anhydride.

6. A process in accordance with Claim 1 wherein the acylated derivative of the aminopyridine has the structure:

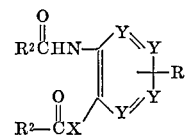

wherein X is oxygen or sulfur, R² is alkyl containing from one to about three carbon atoms and including the steps of reacting the acylated derivative with an o-halobenzyl halide in the presence of an alkali metal or alkaline earth metal hydroxide or alkoxide in the presence of an alcohol solvent to form an amide of the structure:

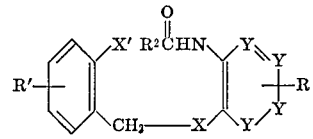

and saponifying the amide in the presence of an alcohol and a base to form an amino-[(o-halobenzyl)oxy (or thio)]pyridine.

7. A process in accordance with Claim 1 wherein the acylated derivative of the aminopyridine has the structure:

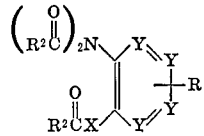

wherein $R^2$ is alkyl containing from one to about three carbons and including the steps of mixing the above acylated derivative in an alcohol solvent with an alkali metal or alkaline earth metal alkoxide or hydroxide, mixing and reacting the resulting solution with an o-halobenzyl halide to form an amide of the structure:

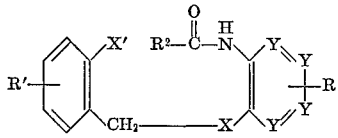

and saponifying the amide in the presence of an alcohol and base to form an amino-[(o-halobenzyl)oxy (or thio)]pyridine.

8. A process in accordance with Claim 1 including the steps of reacting the aminopyridinol with an alkali metal or alkaline earth metal alkoxide or hydroxide in an alcohol solvent to form the corresponding metal salt, reacting the metal salt with an aliphatic acid or acid anhydride to form the metal salt of a hydroxy-2-pyridylamide, reacting the latter metal salt in an alcohol solvent with an o-halobenzyl halide to form an amide of the structure:

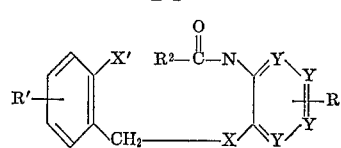

wherein $R^2$ is alkyl containing from one to about three carbon atoms, and saponifying the amide in the presence of an alcohol and base to form an amino-[(o-halobenzyl) oxy (or thio)]pyridine.

References Cited
UNITED STATES PATENTS 3,644,378    2/1972    Yale et al. _____ 260—294.8 F
3,123,614    5/1964    Yale et al. _____ 260—294.8 B

OTHER REFERENCES

Reagents for Organic Synthesis, John Wiley & Sons, Inc., Publishers, vol. L, p. 961, Fieser & Fieser, editors.

ALAN L. ROTMAN, Primary Examiner

U.S. Cl. X.R.

260—294.8 G, 294.8 B, 295 AM, 295 T, 296 R, 296 H; 424—263, 266

UNITED STATES PATENT OFFICE
CERTIFICATE OF CORRECTION

Patent No. 3,849,424                              Dated   November 19, 1974

Inventor(s)   Harry L. Yale

It is certified that error appears in the above-identified patent
and that said Letters Patent are hereby corrected as shown below:

Column 1, line 52, the word "amide" should be: -- amine --.

Column 3, line 43, at the end of the line, that portion reading:
       " and 5-3- " should be: -- and 5-  --.

Column 3, line 48, delete line and substitute in its place:
       -- 4-methyl-2-amino-3-pyridinol, 5-propyl-2-amino-
          3-pyri-        --.

Column 6, line 55, that portion reading: " -[(o-boromo- " should
       be: --  -[(o-bromo-     --.

Column 9, line 19, that portion reading: "Exampl 6" should be:
       -- Example 6 --.

Column 9, Table I, Starting Materials, the structure under
       "Acylated aminopyridinol or pyridinethiol" should be:

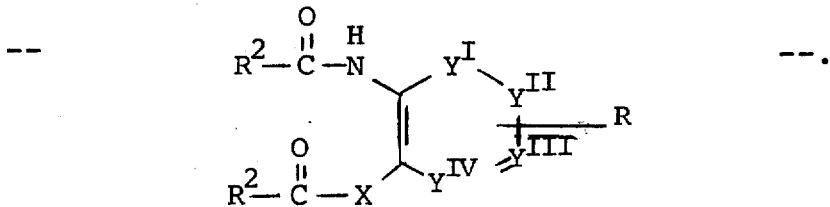

Signed and sealed this 11th day of February 1975.

(SEAL)
Attest:

RUTH C. MASON                         C. MARSHALL DANN
Attesting Officer                     Commissioner of Patents
                                            and Trademarks